US012565142B2

(12) United States Patent (10) Patent No.: US 12,565,142 B2
Aoyama et al. (45) Date of Patent: Mar. 3, 2026

(54) EXTERIOR STRUCTURE, VEHICLE EXTERIOR STRUCTURE, AND METHOD FOR CONTROLLING EXTERIOR STRUCTURE

(71) Applicant: TOYODA GOSEI CO., LTD., Kiyosu (JP)

(72) Inventors: Shunsuke Aoyama, Kiyosu (JP); Koji Okumura, Kiyosu (JP); Koji Fukagawa, Kiyosu (JP); Hiroaki Ando, Kiyosu (JP); Takeshi Yagami, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 89 days.

(21) Appl. No.: 18/758,028

(22) Filed: Jun. 28, 2024

(65) Prior Publication Data

US 2025/0026264 A1    Jan. 23, 2025

(30) Foreign Application Priority Data

Jul. 21, 2023    (JP) .................................. 2023-119177

(51) Int. Cl.
　B60Q 1/50　　　　(2006.01)
　B60Q 1/00　　　　(2006.01)
　　　　(Continued)
(52) U.S. Cl.
　CPC ......... B60Q 1/5035 (2022.05); B60Q 1/0023 (2013.01); B60Q 1/28 (2013.01);
　　　　(Continued)
(58) Field of Classification Search
　CPC ...... B60Q 1/5035; B60Q 1/0023; B60Q 1/28; B60Q 1/503; B60Q 1/507; B60Q 1/543;
　　　　(Continued)

(56) References Cited

U.S. PATENT DOCUMENTS

| | | | | |
|---|---|---|---|---|
| 6,986,597 B2 * | 1/2006 | Elwell | .................. | B60Q 1/2661 |
| | | | | 362/540 |
| 7,163,320 B2 * | 1/2007 | Liu | ...................... | B60Q 1/2661 |
| | | | | 362/540 |
| 8,922,655 B2 * | 12/2014 | Forgue | ................... | B60R 19/52 |
| | | | | 348/148 |
| 9,586,518 B2 * | 3/2017 | Salter | ...................... | F21S 43/26 |

(Continued)

FOREIGN PATENT DOCUMENTS

| | | | |
|---|---|---|---|
| JP | 2008105556 A | * | 5/2008 |
| JP | 2021160219 A | | 10/2021 |

(Continued)

OTHER PUBLICATIONS

U.S. Appl. No. 18/758,468, filed Jun. 28, 2024, Aoyama et al.

*Primary Examiner* — Eric Blount
(74) *Attorney, Agent, or Firm* — Posz Law Group, PLC

(57) ABSTRACT

An exterior structure includes a non-light-transmitting portion configured to not transmit an external light, and a light-transmitting portion arranged near the non-light-transmitting portion and configured to reflect and transmit the external light. Light released outward from the non-light-transmitting portion includes light reflected by the non-light-transmitting portion. Light released outward from the light-transmitting portion includes a combination of light reflected by the light-transmitting portion and light applied to the light-transmitting portion from an inner side and passing through the light-transmitting portion. The color difference ΔE between the light released outward from the non-light-transmitting portion and the light released outward from the light-transmitting portion is 5 or less.

6 Claims, 2 Drawing Sheets

(51) Int. Cl.

| | |
|---|---|
| *B60Q 1/28* | (2006.01) |
| *F21S 43/14* | (2018.01) |
| *F21S 43/20* | (2018.01) |
| *F21S 43/33* | (2018.01) |
| *F21W 103/60* | (2018.01) |

(52) U.S. Cl.
CPC ............. *F21S 43/14* (2018.01); *F21S 43/255* (2018.01); *F21S 43/331* (2024.05); *F21W 2103/60* (2018.01)

(58) Field of Classification Search
CPC ........ F21S 43/14; F21S 43/255; F21S 43/331; F21S 11/00; F21W 2103/60; F21W 2107/10; F21W 2104/00; B60R 19/52; B60R 13/04; B60R 2019/525; B60R 2019/505; B32B 27/08; B32B 27/20; B32B 27/365; B32B 2307/4026; B32B 2307/412; B32B 2307/416; B32B 2605/00; F21V 5/00; F21V 7/00; F21V 9/00; F21V 11/00
USPC .................................. 340/468; 362/487, 496
See application file for complete search history.

(56) References Cited

U.S. PATENT DOCUMENTS

| | | | | |
|---|---|---|---|---|
| 9,789,814 B2 * | 10/2017 | Tanaka | ..................... | B60Q 1/50 |
| 11,946,613 B2 * | 4/2024 | Grimm | ................... | G09F 13/04 |
| 12,264,798 B2 * | 4/2025 | Joo | ......................... | F21S 43/30 |
| 2008/0253140 A1 * | 10/2008 | Fleischmann | .......... | G02B 6/006 |
| | | | | 29/832 |
| 2010/0232174 A1 * | 9/2010 | Arakawa | ................. | F21V 29/60 |
| | | | | 362/546 |
| 2013/0107046 A1 * | 5/2013 | Forgue | .................... | B60R 19/52 |
| | | | | 348/148 |
| 2016/0090027 A1 * | 3/2016 | Tanaka | ................. | B60Q 1/2661 |
| | | | | 362/516 |
| 2023/0304642 A1 * | 9/2023 | Sato | ...................... | F21S 43/145 |
| 2025/0229703 A1 * | 7/2025 | Okumura | ................. | B60Q 1/28 |

FOREIGN PATENT DOCUMENTS

| | | | | | |
|---|---|---|---|---|---|
| JP | 2022007921 A | | 1/2022 | | |
| JP | 2022035593 A | | 3/2022 | | |
| JP | 2023147322 A | * | 10/2023 | | |
| KR | 20240008743 A | * | 1/2024 | ............. | F21S 41/10 |

* cited by examiner

EXTERIOR STRUCTURE, VEHICLE EXTERIOR STRUCTURE, AND METHOD FOR CONTROLLING EXTERIOR STRUCTURE

CROSS-REFERENCE TO RELATED APPLICATIONS

This application is based upon and claims the benefit of priority from prior Japanese Patent Application No. 2023-119177, filed on Jul. 21, 2023, the entire contents of which are incorporated herein by reference.

BACKGROUND

1. Field

The present disclosure relates to an exterior structure, a vehicle exterior structure, and a method for controlling an exterior structure.

2. Description of Related Art

Japanese Laid-Open Patent Publication No. 2022-35593 discloses a light-emitting grille used as a front grille forming a vehicle exterior structure. Such a light-emitting grille includes a light-transmitting outer cover and a light-emitting element arranged at the inner side of the outer cover. The light-emitting grille emits light by allowing light from the light-emitting element to pass through the outer cover at night.

The light-emitting grille is not usually caused to emit light during the daytime. When external light such as sunlight strikes the light-emitting grille while the light-emitting element does not emit light, part of the striking light passes through the outer cover and the rest is reflected by the outer cover. In some cases, the vehicle includes a hood arranged adjacent to the light-emitting grille. When external light strikes the hood, the hood reflects most of the striking light. This will result in a significant difference between the appearance of the light-emitting grille and the appearance of the hood and may adversely affect the appearance of the vehicle.

Such an issue is not limited to the vehicle exterior structure, but is generally common to non-vehicle exterior structures including a non-light-transmitting portion that does not transmit light and a light-transmitting portion that is arranged near the non-light-transmitting portion and reflects and transmits light.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an exterior structure includes a non-light-transmitting portion configured to not transmit an external light, and a light-transmitting portion arranged near the non-light-transmitting portion and configured to reflect and transmit the external light. Light released outward from the non-light-transmitting portion includes light reflected by the non-light-transmitting portion. Light released outward from the light-transmitting portion includes a combination of light reflected by the light-transmitting portion and light applied to the light-transmitting portion from an inner side and passing through the light-transmitting portion. The color difference $\Delta E$ between the light released outward from the non-light-transmitting portion and the light released outward from the light-transmitting portion is 5 or less.

In another general aspect, a vehicle exterior structure includes a non-light-transmitting portion configured to not transmit an external light, a light-transmitting portion arranged near the non-light-transmitting portion and configured to reflect and transmit the external light, and a display light source arranged at the inner side of the light-transmitting portion. The display light source is configured to emit light to the light-transmitting portion to illuminate and display the light-transmitting portion. The light-transmitting portion, in accordance with light emission by the display light source, exhibits color in a state in which an exterior color of the light-transmitting portion is similar to an exterior color of the non-light-transmitting portion or in a state in which the exterior color of the light-transmitting portion is the same as the exterior color of the non-light-transmitting portion.

In another general aspect, a method for controlling an exterior structure is provided. The exterior structure includes a non-light-transmitting portion configured to not transmit an external light, a light-transmitting portion arranged near the non-light-transmitting portion and configured to reflect and transmit the external light, and a light-emitting diode arranged at an inner side of the light-transmitting portion and emitting visible light. Light released outward from the non-light-transmitting portion includes light reflected by the non-light-transmitting portion. Light released outward from the light-transmitting portion includes a combination of light reflected by the light-transmitting portion and light applied to the light-transmitting portion from the inner side and passing through the light-transmitting portion. The method includes causing the light-emitting diode to emit light such that a color difference $\Delta E$ between the light released outward from the non-light-transmitting portion and the light released outward from the light-transmitting portion is 5 or less.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An exterior structure configured as a vehicle exterior structure according to one embodiment will now be described with reference to the drawings.

Components of Vehicle 11

Figure 1:
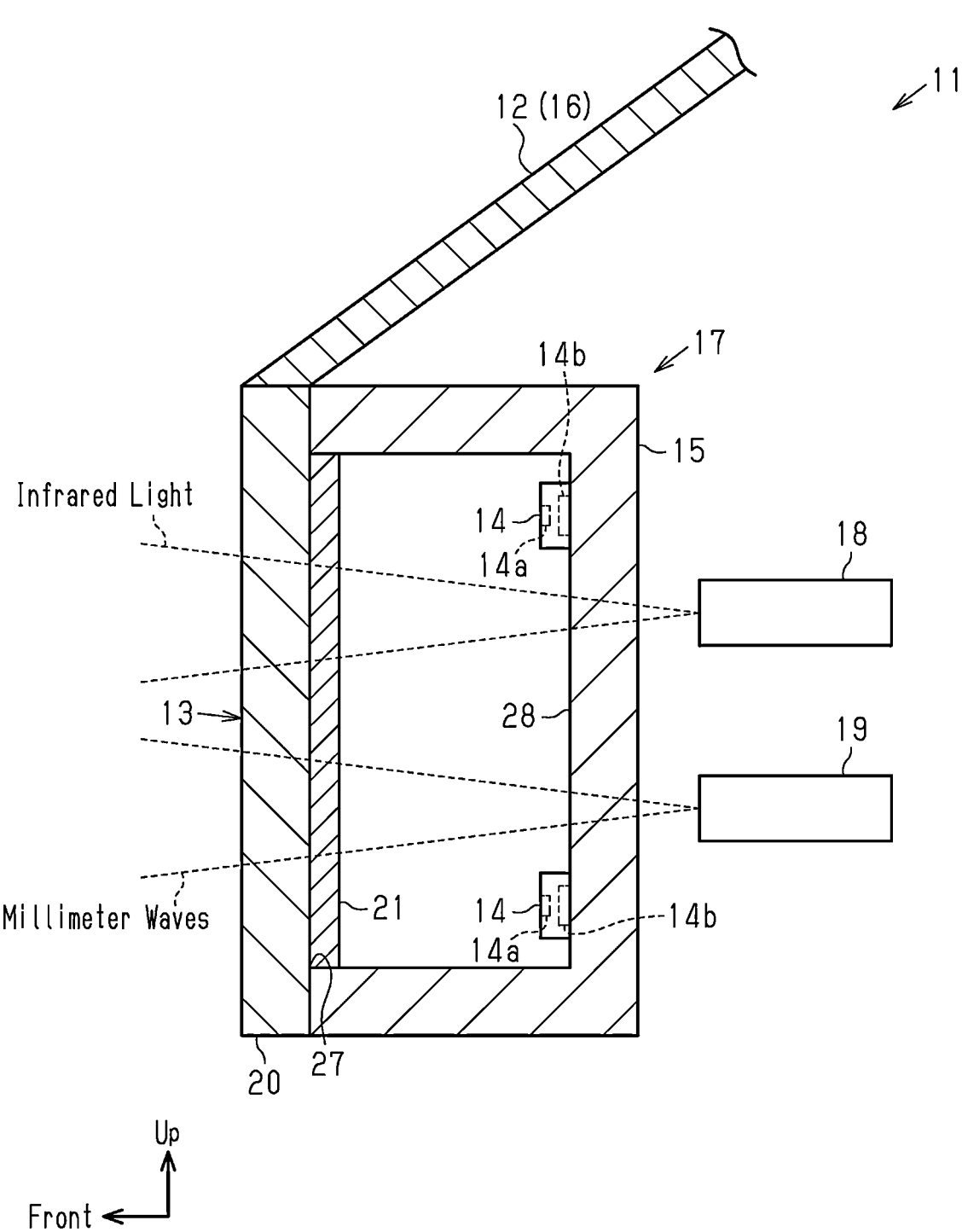
FIG. 1 is a schematic cross-sectional view showing a vehicle exterior structure according to one embodiment.

As shown in FIG. 1, an exterior structure of a vehicle 11, which is an example of the exterior structure, includes a non-light-transmitting portion 12, a light-transmitting portion 13, display light sources 14, and a housing 15. The non-light-transmitting portion 12 is plate-shaped. The non-light-transmitting portion 12 forms, for example, a hood 16 arranged in the front of the vehicle 11. The light-transmitting portion 13, the display light sources 14, and the housing 15 form, for example, a light-emitting grille 17. The light-transmitting portion 13 is plate-shaped. The light-transmitting portion 13 forms, for example, an exterior of the light-emitting grille 17 arranged in the front of the vehicle 11.

In the following description, the left side in FIG. 1 is defined as the front side, and the right side in FIG. 1 is defined as the rear side. In addition, directions represented by terms such as front, rear, up, down, left, and right are defined with reference to a vehicle.

The light-transmitting portion 13 is arranged near the non-light-transmitting portion 12. In one example, the light-transmitting portion 13 is arranged adjacent to the lower side of the non-light-transmitting portion 12. The exterior color of the non-light-transmitting portion 12 and the exterior color of the light-transmitting portion 13 are similar to each other. An infrared sensor 18 and a millimeter wave sensor 19 are arranged next to each other in the vertical direction at the rear side of the light-emitting grille 17 in the vehicle 11.

The infrared sensor 18 transmits infrared light (near-infrared light) forward from the vehicle 11 and receives infrared light striking and reflected by an object outside the vehicle including a preceding vehicle, a pedestrian, and the like. The infrared light transmitted by the infrared sensor 18 has wavelengths in a range of 900 nm to 2000 nm. The infrared sensor 18 recognizes the object and detects the distance between the vehicle 11 and the object, the relative speed between the vehicle 11 and the object, and the like based on the transmitted and received infrared light. The infrared sensor 18 can detect an object smaller than an object that can be detected by the millimeter wave sensor 19.

The millimeter wave sensor 19 transmits millimeter waves forward from the vehicle 11 and receives millimeter waves striking and reflected by an object outside the vehicle including a preceding vehicle, a pedestrian, and the like. The millimeter wave sensor 19 recognizes the object and detects the distance between the vehicle 11 and the object, the relative speed between the vehicle 11 and the object, and the like based on the transmitted and received millimeter waves. Millimeter waves are electromagnetic waves with wavelengths in a range of 1 mm to 10 mm and frequencies in a range of 30 GHz to 300 GHz. The millimeter wave sensor 19 is resistant to bad weather such as rain, fog, and snow, and has a longer detectable distance than the infrared sensor 18.

Non-Light-Transmitting Portion 12

As shown in FIG. 1, the non-light-transmitting portion 12 does not transmit external light such as sunlight. In other words, when receiving the external light, the non-light-transmitting portion 12 reflects substantially 100% of the light that has wavelengths not absorbed by the non-light-transmitting portion 12.

Light-Transmitting Portion 13

Figure 2:
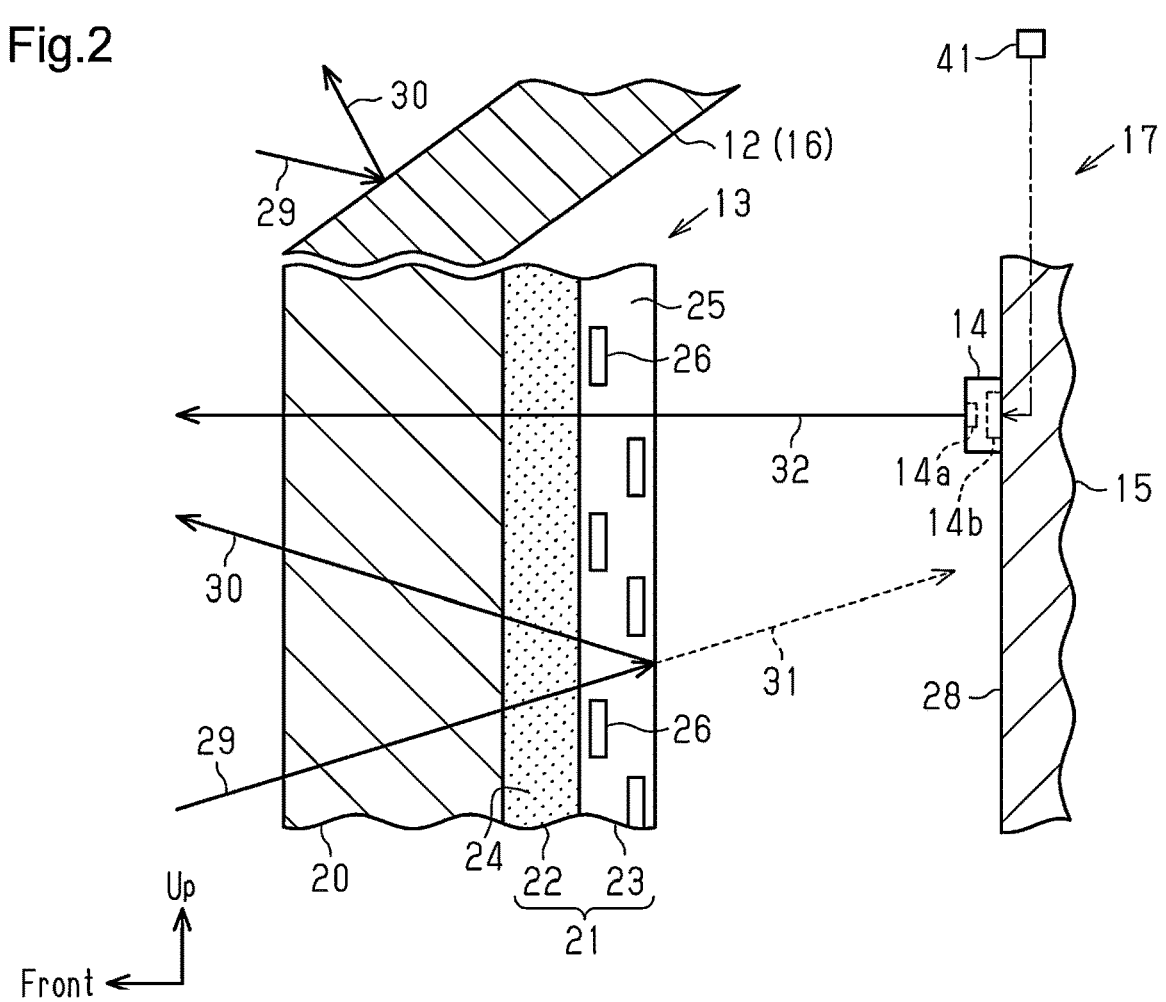
FIG. 2 is a partially enlarged view of the vehicle exterior structure shown in FIG. 1.

As shown in FIGS. 1 and 2, the light-transmitting portion 13 reflects and transmits external light such as sunlight. In other words, when receiving the external light, the light-transmitting portion 13 reflects part of the light that has wavelengths not absorbed by the light-transmitting portion 13, and transmits the remaining light. For example, when receiving the external light, the light-transmitting portion 13 reflects 80% of the light that has wavelengths not absorbed by the light-transmitting portion 13, the light-transmitting portion 13 transmits the remaining 20%. As described above, the exterior color of the non-light-transmitting portion 12 and the exterior color of the light-transmitting portion 13 are similar to each other. Thus, the wavelengths of light that is not absorbed by the non-light-transmitting portion 12 are substantially the same as the wavelengths of light that is not absorbed by the light-transmitting portion 13

The light-transmitting portion 13 includes a plate-shaped transparent plastic base member 20 and an ornamental layer 21 arranged on the rear surface of the transparent plastic base member 20. The ornamental layer 21 includes a first color exhibiting layer 22 arranged on the rear surface of the transparent plastic base member 20 and a second color exhibiting layer 23 arranged on the rear surface of the first color exhibiting layer 22. The transparent plastic base member 20 is made of, for example, a polycarbonate (PC) plastic. The first color exhibiting layer 22 is a layer in which a first base plastic 24 contains dye or pigment.

Figure 3:
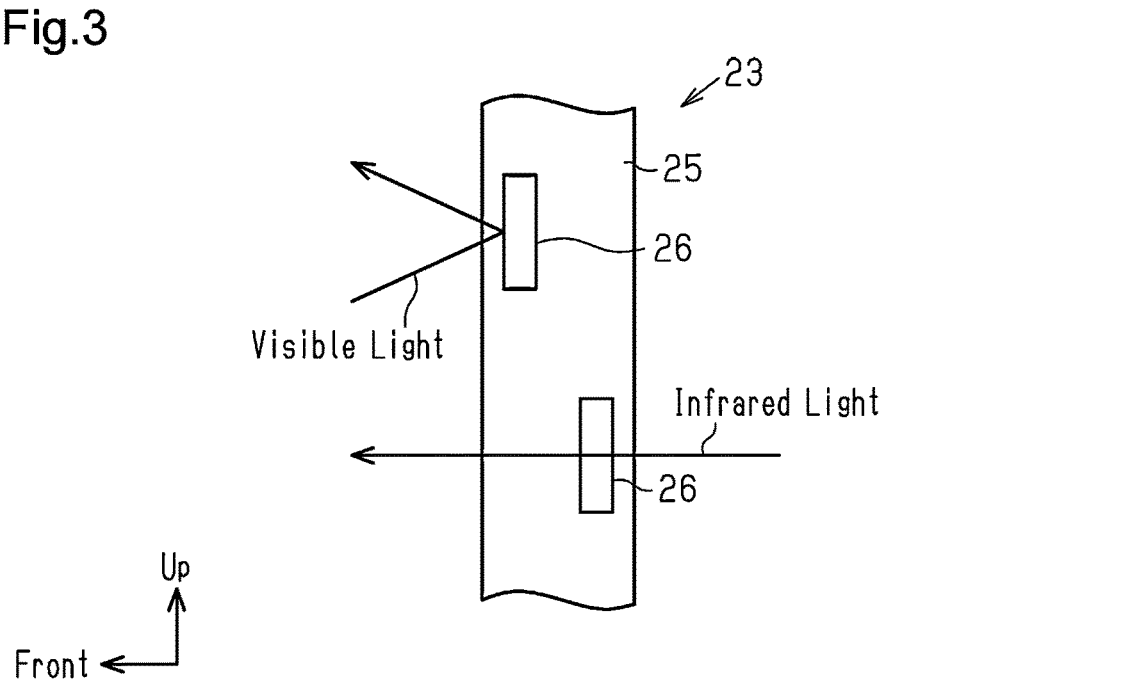
FIG. 3 is a partially enlarged view of a second color exhibiting layer included in the vehicle exterior structure shown in FIG. 1.

As shown in FIGS. 2 and 3, the second color exhibiting layer 23 is a layer in which a second base plastic 25 contains fillers 26 made of a cold mirror thin film. The cold mirror thin film reflects visible light and transmits infrared light.

As shown in FIGS. 1 and 2, the light-transmitting portion 13 preferably has a transmittance in a range of 5% to 20% for visible light having wavelengths in a range of 380 nm to 800 nm. When the light-transmitting portion 13 has a transmittance of less than 5% for visible light, the amount of light from the display light source 14 passing through the light-transmitting portion 13 may be insufficient. When the light-transmitting portion 13 has a transmittance exceeding 20% for visible light, the reflectance of visible light in the light-transmitting portion 13 is excessively less than the reflectance of visible light in the non-light-transmitting portion 12. This may increase the difference in appearance between the non-light-transmitting portion 12 and the light-transmitting portion 13.

The light-transmitting portion 13 preferably has a maximum transmittance of 60% or more for infrared light having wavelengths in a range of 900 nm to 2000 nm. When the light-transmitting portion 13 has a maximum transmittance of less than 60% for infrared light, the detection accuracy of the infrared sensor 18 may be insufficient. The light-transmitting portion 13 preferably has an attenuation factor of 3.0 dB or less for millimeter waves during bidirectional travel. When the light-transmitting portion 13 has an attenuation factor exceeding 3.0 dB for millimeter waves during bidirectional travel, the detection accuracy of the millimeter wave sensor 19 may be insufficient.

Housing 15

As shown in FIG. 1, the housing 15 is rectangular and box-shaped including an opening 27 arranged at the front end. The opening 27 of the housing 15 is closed by the transparent plastic base member 20 of the light-transmitting portion 13. The housing 15 includes an opposed surface 28 opposed to the light-transmitting portion 13. The ornamental layer 21 of the light-transmitting portion 13 is arranged inside the housing 15.

The housing 15 is made of, for example, a polycarbonate (PC) plastic, an acrylonitrile-butadiene-styrene (ABS) copolymer plastic, an acrylonitrile-ethylene-propylene-diene styrene (AES) plastic, an acrylonitrile-styrene-acrylate (ASA) copolymer plastic, or the like.

The display light sources 14 are arranged at the upper end and the lower end of the opposed surface 28 opposed to the light-transmitting portion 13 in the housing 15. In other words, the housing 15 accommodates the two display light sources 14. Thus, each display light source 14 is arranged at the rear side (inner side) of the light-transmitting portion 13. The display light source 14 includes a light-emitting diode (LED) 14a that emits visible light and a control circuit 14b that controls the LED 14a. The display light source 14 emits visible light to the light-transmitting portion 13, and the visible light passing through the light-transmitting portion 13 illuminates and displays a character, a pattern, and the like.

The control circuit 14b, which is processing circuitry, may include (1) one or more processors that operate according to a computer program (software), (2) one or more dedicated hardware circuits such as application specific integrated circuits (ASICs) that execute at least part of various processes, or (3) a combination thereof. The processor includes a central processing unit (CPU) and memory such as random-access memory (RAM) and read-only memory (ROM). The memory stores program code or commands configured to cause the CPU to execute processes. The memory, which is a non-transitory computer-readable medium, includes any type of media that are accessible by general-purpose computers and dedicated computers. Various types of control with the control circuit 14b are performed by the CPU executing programs stored in the memory at predetermined calculation cycles.

Operation of Embodiment

The vehicle 11 normally causes the display light sources 14 to emit light while traveling at night. Then, the light from the light sources 14 strikes the light-transmitting portion 13, and the light passing through the light-transmitting portion 13 illuminates and displays a character, a pattern or the like.

In contrast, the vehicle 11 does not cause the display light sources 14 to emit light while traveling during the daytime because the vehicle 11 does not normally illuminate or display the character, the pattern, or the like in the light-transmitting portion 13. The light-transmitting portion 13 reflects part of light from an incoming external light, such as sunlight, having wavelengths not absorbed by the light-transmitting portion 13, and transmits the remaining light. In this case, the non-light-transmitting portion 12 adjacent to the light-transmitting portion 13 reflects substantially all of the light from the incoming sunlight that has wavelengths not absorbed by the non-light-transmitting portion 12. Thus, the reflectance of the sunlight in the light-transmitting portion 13 is less than the reflectance of the sunlight in the non-light-transmitting portion 12.

The amount of sunlight reflected by the light-transmitting portion 13 is less than the amount of sunlight reflected by the non-light-transmitting portion 12. In other words, there is a difference between the amount of sunlight reflected by the light-transmitting portion 13 and the amount of sunlight reflected by the non-light-transmitting portion 12. When this difference increases, even if the exterior color of the light-transmitting portion 13 and the exterior color of the non-light-transmitting portion 12 are similar to each other, color appearance will be significantly different between the light-transmitting portion 13 and the non-light-transmitting portion 12. As a result, the boundary between the light-transmitting portion 13 and the non-light-transmitting portion 12 is noticeable, adversely affecting the appearance of the vehicle 11.

In this respect, in the present embodiment, the display light sources 14 emit light while the vehicle 11 is traveling during the daytime. Thus, light released outward from the light-transmitting portion 13 is a combination of sunlight reflected by the light-transmitting portion 13 and light emitted from the display light sources 14 arranged at the rear side (inner side) of the light-transmitting portion 13, which then passes through the light-transmitting portion 13. Light released outward from the non-light-transmitting portion 12 is sunlight reflected by the non-light-transmitting portion 12. The control circuit 14b causes the display light sources 14 to emit light such that the color difference ΔE between the light released outward from the non-light-transmitting portion 12 and the light released outward from the light-transmitting portion 13 is 5 or less.

Thus, the light-transmitting portion 13 exhibits color in a state in which the exterior color of the light-transmitting portion 13 is similar to the exterior color of the non-light-transmitting portion 12 or in a state in which the exterior color of the light-transmitting portion 13 is the same as the exterior color of the non-light-transmitting portion 12. This is because the exterior color of the non-light-transmitting portion 12 and the exterior color of the light-transmitting portion 13 have a more similar appearance as the color difference ΔE between the light released outward from the light-transmitting portion 13 and the light released outward from the non-light-transmitting portion 12 decreases.

As a result, the appearance of the light-transmitting portion 13 and the appearance of the non-light-transmitting portion 12 are extremely close to each other, and thus the boundary between the light-transmitting portion 13 and the non-light-transmitting portion 12 is less noticeable. This improves the appearance of the vehicle 11.

In an example, as indicated by arrows in FIG. 2, from the amount of incident sunlight 29 entering the light-transmitting portion 13 and the non-light-transmitting portion 12, the total amount of light that has wavelengths not absorbed by the light-transmitting portion 13 and the non-light-transmitting portion 12 is each referred to as "100." In this case, the light-transmitting portion 13 reflects "80" of the incident sunlight 29 as reflected light 30 and transmits "20" of the remaining incident sunlight 29 as transmitted light 31. The non-light-transmitting portion 12 reflects "100" of the incident sunlight 29 as reflected light 30. In this state, the amount of light released outward from the light-transmitting portion 13 is "80," and the amount of light released outward from the non-light-transmitting portion 12 is "100."

In such a case, the display light sources 14 emit an irradiation light 32 to the light-transmitting portion 13 such that the amount of light released outward from the display light sources 14 and passing through the light-transmitting portion 13 is "20." The amount of light released outward from the light-transmitting portion 13 is "80+20=100." Thus, the amount of light released outward from the light-transmitting portion 13 is the same as the amount of light released outward from the non-light-transmitting portion 12.

In other words, the color difference ΔE between the light released outward from the light-transmitting portion 13 and the light released outward from the non-light-transmitting portion 12 is 0. Thus, the exterior color of the light-transmitting portion 13 is the same as the exterior color of the non-light-transmitting portion 12. This improves the appearance of the vehicle 11 as the boundary between the light-transmitting portion 13 and the non-light-transmitting portion 12 is less noticeable.

The amount of the incident sunlight 29 entering the light-transmitting portion 13 and the non-light-transmitting portion 12 changes depending on weather. Thus, the vehicle 11 includes an optical sensor 41 that detects the amount of the incident sunlight 29. The control circuit 14*b* preferably adjusts the amount of the irradiation light 32 emitted from the display light sources 14 to the light-transmitting portion 13 based on a detection result of the optical sensor 41.

In addition, since the light-transmitting portion 13 has a maximum transmittance of 60% or more for infrared light having wavelengths in the range of 900 nm to 2000 nm, the detection accuracy of the infrared sensor 18 is ensured. Furthermore, since the light-transmitting portion 13 has an attenuation factor of 3.0 dB or less for millimeter waves during bidirectional travel, the detection accuracy of the millimeter wave sensor 19 is ensured. Thus, the light-transmitting portion 13 also serves as an electromagnetic wave-transmitting cover.

Advantages of Embodiment

The above-described embodiment achieves the following advantages.

(1) The exterior structure of the vehicle 11 includes the non-light-transmitting portion 12 that does not transmit external light, the light-transmitting portion 13 arranged near the non-light-transmitting portion 12, and the display light sources 14 arranged at the inner side of the light-transmitting portion 13. When receiving external light, the light-transmitting portion 13 reflects part of the light that has wavelengths not absorbed by the light-transmitting portion 13, and transmits the remaining light. The display light sources 14 emit light to the light-transmitting portion 13 to illuminate and display the light-transmitting portion 13. The light-transmitting portion 13, in accordance with the light emission by the display light source 14, exhibits color in the state in which the exterior color of the light-transmitting portion 13 is similar to the exterior color of the non-light-transmitting portion 12 or in the state in which the exterior color of the light-transmitting portion 13 is the same as the exterior color of the non-light-transmitting portion 12.

With the above structure, the difference in appearance between the non-light-transmitting portion 12 and the light-transmitting portion 13 is reduced or eliminated, and the boundary between the non-light-transmitting portion 12 and the light-transmitting portion 13 is less noticeable. This improves the appearance of the vehicle 11.

(2) In the exterior structure of the vehicle 11, the light-transmitting portion 13 includes the transparent plastic base member 20, the first color exhibiting layer 22 containing dye or pigment, and the second color exhibiting layer 23 containing the fillers 26 made of a cold mirror thin film reflecting visible light and transmitting infrared light. The light-transmitting portion 13 has a transmittance in the range of 5% to 20% for visible light having wavelengths in the range of 380 nm to 800 nm, a maximum transmittance of 60% or more for infrared light having wavelengths in the range of 900 nm to 2000 nm, and an attenuation factor of 3.0 dB or less for millimeter waves.

With the above structure, the light-transmitting portion 13 does not block transmission of infrared light and millimeter waves. Thus, when an electromagnetic wave sensor such as the infrared sensor 18 or the millimeter wave sensor 19 is arranged at the inner side of the light-transmitting portion 13, the light-transmitting portion 13 can serve as an electromagnetic wave-transmitting cover that covers the infrared sensor 18, the millimeter wave sensor 19, or the like.

Modifications

The above-described embodiment may be modified as follows. The above-described embodiment and the following modifications can be combined as long as the combined modifications remain technically consistent with each other.

The light-transmitting portion 13 does not need to have a transmittance in the range of 5% to 20% for visible light having wavelengths in the range of 380 nm to 800 nm.

The light-transmitting portion 13 does not need to have a maximum transmittance of 60% or more for infrared light having wavelengths in the range of 900 nm to 2000 nm.

The light-transmitting portion 13 does not need to have an attenuation factor of 3.0 dB or less for millimeter waves.

External light does not need to be sunlight and may be light from, for example, lighting equipment installed outdoors or indoors.

The ornamental layer 21 may include at least one of a tinted layer that adjusts reflected light and a complementary color layer that adjusts exhibited color.

The exterior structure of the above-described embodiment may be applied to an exterior structure besides the vehicle 11, for example, an exterior structure of a building including the non-light-transmitting portion 12 and the light-transmitting portion 13 on an exterior wall.

The exterior structure does not need to have a light source. The light applied to the light-transmitting portion 13 from the inner side and passing through the light-transmitting portion 13 may be, for example, light from a light source inside the exterior structure or light from the outside of the exterior structure. In the case in which the light is the light from the outside of the exterior structure, the light is reflected at the rear side (inner side) of the light-transmitting portion 13, and is then applied to the light-transmitting portion 13 from the inner side and passing through the light-transmitting portion 13. Thus, light released outward from the light-transmitting portion 13 is a combination of the external light reflected by the light-transmitting portion 13 and the light applied to the light-transmitting portion 13 from the inner side and passing through the light-transmitting portion 13. Further, the exterior structure is configured such that the color difference ΔE between the light released outward from the non-light-transmitting portion 12 and the light released outward from the light-transmitting portion 13 is 5 or less. In this manner, the difference in appearance between the non-light-transmitting portion 12 and the light-transmitting portion 13 is reduced, and thus the boundary between the non-light-transmitting portion 12 and the light-transmitting portion 13 is less noticeable. This improves the appearance of the exterior structure.

In the exterior structure of the vehicle 11, a non-light-transmitting portion and a light-transmitting portion may be arranged adjacent to each other in the light-emitting grille 17.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An exterior structure, comprising:
a non-light-transmitting portion configured to not transmit an external light; and
a light-transmitting portion arranged near the non-light-transmitting portion and configured to reflect and transmit the external light, wherein
light released outward from the non-light-transmitting portion includes light reflected by the non-light-transmitting portion,
light released outward from the light-transmitting portion includes a combination of light reflected by the light-transmitting portion and light applied to the light-transmitting portion from an inner side and passing through the light-transmitting portion, and
a color difference ΔE between the light released outward from the non-light-transmitting portion and the light released outward from the light-transmitting portion is 5 or less.

2. The exterior structure according to claim 1, further comprising a display light source arranged at the inner side of the light-transmitting portion, the display light source being configured to emit light to the light-transmitting portion to illuminate and display the light-transmitting portion, wherein
the display light source includes a light-emitting diode that emits visible light and processing circuitry configured to control light emission of the light-emitting diode, and
the processing circuitry is configured to cause the light-emitting diode to emit light such that the color difference ΔE between the light released outward from the non-light-transmitting portion and the light released outward from the light-transmitting portion is 5 or less.

3. A vehicle exterior structure, comprising:
a non-light-transmitting portion configured to not transmit an external light;
a light-transmitting portion arranged near the non-light-transmitting portion and configured to reflect and transmit the external light; and
a display light source arranged at the inner side of the light-transmitting portion, the display light source being configured to emit light to the light-transmitting portion to illuminate and display the light-transmitting portion, wherein
the light-transmitting portion, in accordance with light emission by the display light source, exhibits color in a state in which an exterior color of the light-transmitting portion is similar to an exterior color of the non-light-transmitting portion or in a state in which the exterior color of the light-transmitting portion is the same as the exterior color of the non-light-transmitting portion.

4. The vehicle exterior structure according to claim 3, wherein
the light-transmitting portion includes
a transparent plastic base member,
a first color exhibiting layer containing dye or pigment, and
a second color exhibiting layer containing a filler made of a cold mirror thin film reflecting visible light and transmitting infrared light, and
the light-transmitting portion has a transmittance in a range of 5% to 20% for visible light having wavelengths in a range of 380 nm to 800 nm, a maximum transmittance of 60% or more for infrared light having wavelengths in a range of 900 nm to 2000 nm, and an attenuation factor of 3.0 dB or less for millimeter waves.

5. The vehicle exterior structure according to claim 3, wherein
the display light source includes a light-emitting diode that emits visible light and processing circuitry configured to control light emission of the light-emitting diode, and
the processing circuitry is configured to cause the light-emitting diode to emit light such that the light-transmitting portion exhibits color in the state in which the exterior color of the light-transmitting portion is similar to the exterior color of the non-light-transmitting portion or in the state in which the exterior color of the light-transmitting portion is the same as the exterior color of the non-light-transmitting portion.

6. A method for controlling an exterior structure, the exterior structure including:
a non-light-transmitting portion configured to not transmit an external light;
a light-transmitting portion arranged near the non-light-transmitting portion and configured to reflect and transmit the external light; and
a light-emitting diode arranged at an inner side of the light-transmitting portion and emitting visible light, wherein
light released outward from the non-light-transmitting portion includes light reflected by the non-light-transmitting portion,
light released outward from the light-transmitting portion includes a combination of light reflected by the light-transmitting portion and light applied to the light-transmitting portion from the inner side and passing through the light-transmitting portion, and
the method comprising causing the light-emitting diode to emit light such that a color difference ΔE between the light released outward from the non-light-transmitting portion and the light released outward from the light-transmitting portion is 5 or less.

* * * * *